United States Patent [19]

Wittwer

[11] Patent Number: 4,596,367

[45] Date of Patent: Jun. 24, 1986

[54] HORIZONTAL WIND/WATER WHEEL WITH VERTICAL LIFT A SUPERIOR PROTYPE MODEL

[76] Inventor: John J. Wittwer, 109 Minna St. #239, San Francisco, Calif. 94105

[21] Appl. No.: 584,773

[22] Filed: Feb. 29, 1984

[51] Int. Cl.⁴ .............................................. B64C 27/00
[52] U.S. Cl. .................. 244/39; 416/DIG. 3; 446/36; 244/17.11
[58] Field of Search .............. 244/39, 17.11, 35 R, 244/34 R, 4, 153 A; 446/34, 217, 36, 37, 38; 416/132 A, 132 B, DIG. 3; D21/93

[56] References Cited

U.S. PATENT DOCUMENTS

| D. 51,348 | 10/1917 | McGoveron | D21/93 |
| D. 146,187 | 1/1947 | Mitschang | D21/93 |
| 1,043,830 | 11/1912 | Heath | 416/132 A |
| 2,074,327 | 3/1937 | DeCourcy | 244/153 A |
| 2,690,151 | 9/1954 | House | 416/DIG. 3 |
| 2,996,120 | 8/1961 | McGregor | 446/217 |
| 3,124,898 | 3/1964 | Henrichsen | 446/38 |

FOREIGN PATENT DOCUMENTS

| 820412 | 11/1951 | Fed. Rep. of Germany ... 244/153 A |
| 2053010 | 6/1979 | United Kingdom ................ 446/36 |

Primary Examiner—Galen L. Barefoot
Attorney, Agent, or Firm—Robert E. Wickersham

[57] ABSTRACT

A rotary fluid propelled device employing a natural theory of constriction and controlled redistribution to convert fluid flow to rotary mechanical energy. Two conical shell-shaped compartments opposite each other are connected by a midaxis transfer band forming the device. Rotary mechanical energy, mechanical lift force and high visual interest result from the operation of the device.

3 Claims, 3 Drawing Figures

HORIZONTAL WIND/WATER WHEEL WITH VERTICAL LIFT A SUPERIOR PROTYPE MODEL

There is herein disclosed a rotary wind, water stream or surge propelled device and vehicle model employing a more natural theory of the constriction of air or water and its immediate controlled redistribution causing lift.

Having performed a diligent and lengthly search with assistance at the Patent Research Institute finding only U.S. Pat. Nos. 1,379,439, 2,218,599, 3,161,376 and 3,557,477 which were simular only in partial function but neither in full function nor mode of function.

A model to demonstrate certain previously deleted observations relevant to discrepancy in aero-dynamics laws for instance that discredited the bumble bees ability to fly.

In the past many wind operative generation or propulsion units have utilized the principals of motion and lift caused by the simple reaction of air passing by the aero-dynamic members of the devices.

The device herein disclosed more clearly replicates the natural mechanics involved in bird flight and shell fish propulsion, enabling it to display as much rotational power and more weight proportionate lift than any naturally powered apparatus priviously disclosed.

Additional objects and advantages of this device are as follows:

First, it may be formed from a single sheet of semideformable material such as plastic coated paper, plastic thin sheet metal, simular materials or as shown in clear acetate. Also as a preformed single unit of resilient plastics, ceramics or simular material.

Second, as a stationary mounted device will neither self destruct nor require shut down during periods of abnormally high wind velocities but by inherent design features deforms to a shape of suitably less than maximum efficiency.

Third, is useable as a single unit or stacked as a double, triple or quadrupled units on a common axis.

Fourth, provides rotary motion that may be used as a steady flow of power while the wind is blowing as well as a reserve of power gathered from its lift and fall further utilizing even the fluxuation of the breeze or wind.

Fifth, is capable of lifting up to eighty (80) times its own weight in a moderate to heavy wind as well as at least twice its own weight in a light breeze.

Sixth, for rotary power only may be utilized without an adjustable axis as an omni-directional generation unit in either air or water environments.

Seventh, provokes high visual, mechanical and curiosity appeal as it displays the theorys missing from the laws of aero-dynamics that used to prohibit bumble bees and pin wheels from flying.

Eighth, demonstrates self controlled descension in unpowered downward rotations as a free falling vehicle with compatible axis.

IN THE DRAWINGS

Figure 1:
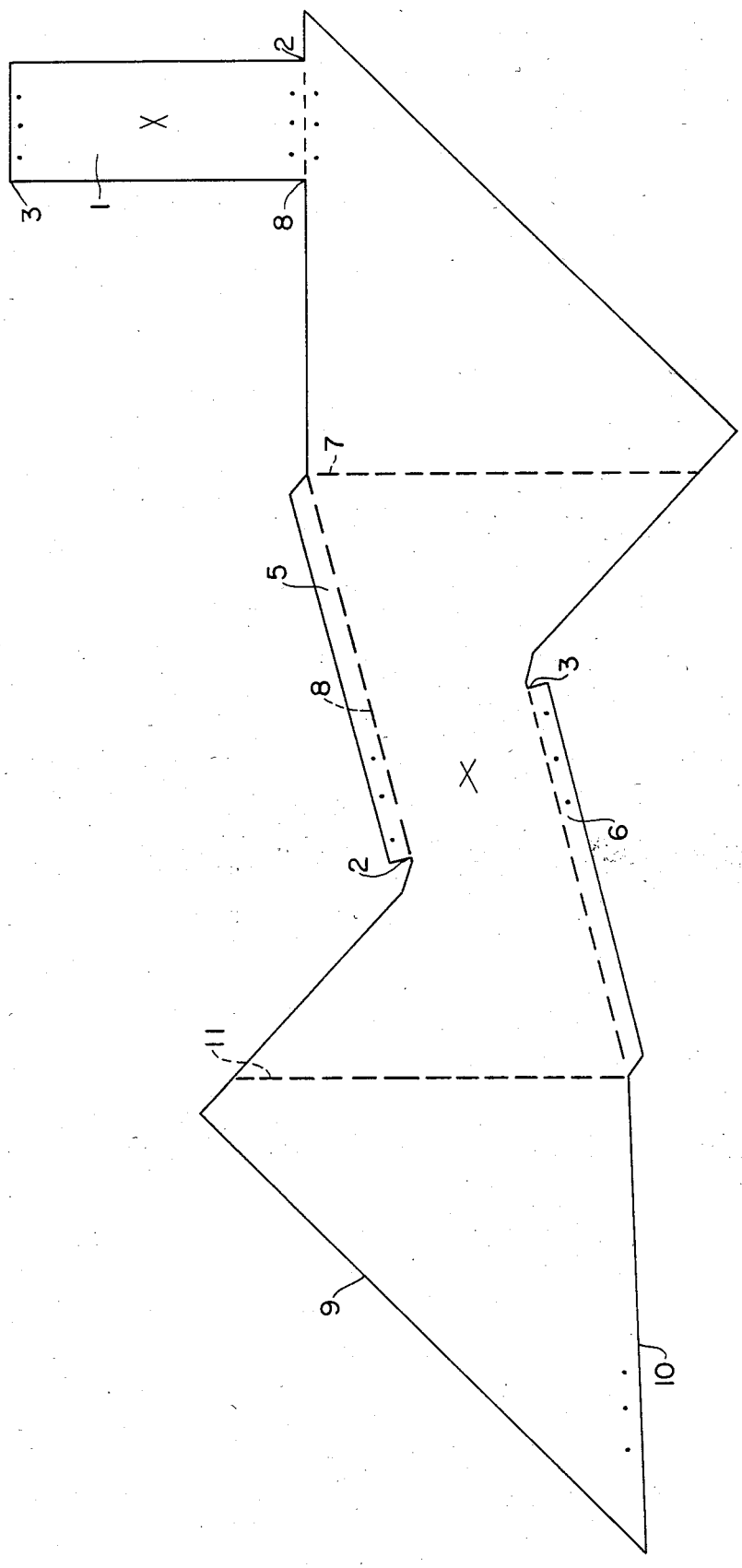
FIG. 1 is a plan view of a blank cut and diagramed in accordance with this invention.

To assemble position tab 1 in the upper right hand corner of the work space and fold it down along the dotted line between corners 2 & 8.

Fold tab 5 down along adjacent dotted line. Fold tab 6 up along the adjacent dotted line.

Loosely fold tab 1 and adjoining edge to fit smoothly under tab 5 forming a tight corner at the junction of lines 7 & 8. Weld tab 1 and adjacent side to tab 5 at the spots indicated by dots between points 2 & 8. Crease fold along dotted line 7.

Loosely fold side 10 under tab 6 forming a tight corner at the junction of side 10 and the dotted line along tab 6, fastening loose end of tab 1 to sides 6 & 10. Crease fold along dotted line 11.

Place plastic drink or bar straw through prepunched holes centered on X marked centers. Flange the top and bottom ends of the straw with heat.

To operate as a stationary model, mount the axis on an appropriate pedestal with the top of the axis tilted 15°–20° downwind from plumb. As a hand held model may be drawn through air indoors to assimulate the same demonstration and with practice may be so launched across the room.

Outdoors hand held, fluxuating the top of the axis between 20° downwind from plumb to about 6° upwind in a steady breeze or wind more readily demonstrates the four way action of the device.

The invention provides a more naturally efficient embodiment of a fixture than has heretofore been shown for use in all the natural movements of wind and or water.

It provides an embodiment through which a specific natural formula regulates the efficiency of the device as described thus far in which the efficiency has been largely reduced so as to provide a safe and small as possible model for the entertainment of the public at large. It provides a visual replica of natural theories wherein nature is reharnessed with a device never before noted or arranged, creating a high visual and mechanical interest type appeal.

It includes a device wherein the natural containment of movement or fluctuations of the surrounding elements are specifically enveloped, constricted and methodically redistributed so as to demonstrate up to eighty (80) times its own weight in lift during a moderately strong wind or at least double its own weight in a slight breeze.

Two shell-shaped compartments are joined by a mid-axis transfer and constriction arrangement which is most simply designated in the drawings as Tab (1).

The genuine and inherent multiple design features of this strap (tab 1) are as follows:

1. It serves as a protective band to prohibit binding and wear both on the axis and the trailing edges of the blades.

2. Acts to spread stress on the lower surface from an area immediately surrounding the axis to a parallelogram shaped area, the widest portions of which extend nearly half way out the folded leading edges.

3. Prevents folding and wobbling tendencies as each end of the assembled device rotates in turn through the oncoming flow of air or water.

4. The inner surface functions during lift as a constriction and transfer chamber.

5. The sidewall portions of the inner surfaces acts as a bank surface enhancing the continual flow of air as the device rotates.

6. With the top of the axis tilted a few degrees from plumb into the wind the outer surface provides an integral stability as a fulcrum to force descent.

Figure 2:
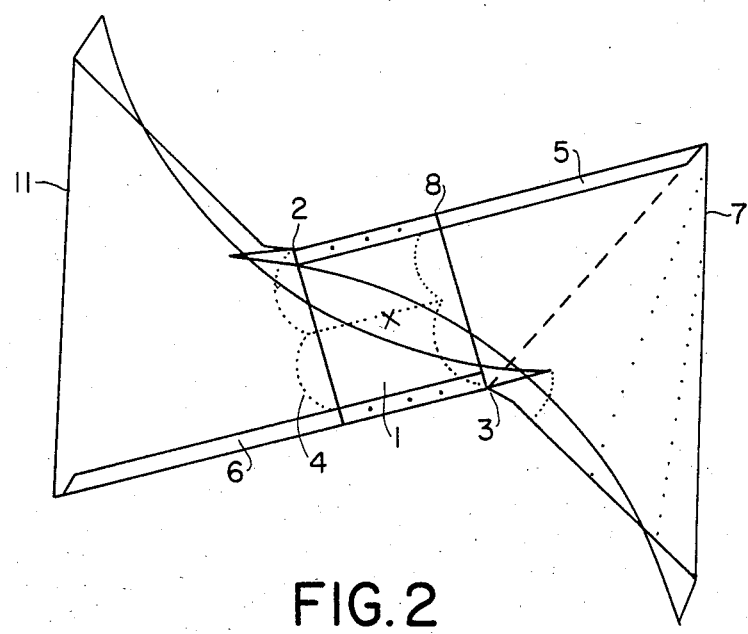
FIG. 2 is a top view of the device fully folded and fastened together.

7. Collapsed by the stop means on the axis' top works as a tensioned but controlled stream flow inhibitor to decrease force of lift and spin. The maximum deformed shape of which is indicated (FIG. 2) by an "m" shaped pattern of dotted lines (4).

Figure 3:
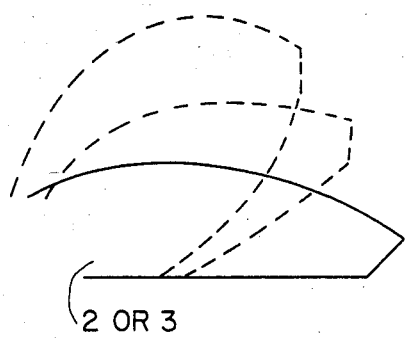
FIG. 3 is a side view of the outer most open portions of the device, diagramed to show how it reshapes itself achieving a more efficient initial lift shape.

8. At maximum free lift force, the four corners of the strap provide fulcrum points at which the outer portions of the assembled device bend upwards, initially improving the efficiency shape (FIG. 3); then the device bends at the top of the axis to a deformed shape as the two opposing outer chambers twist their openings into line with each other.

9. In models larger than three to six times the size shown a similar but longer strap should be extended from side (10) slightly exceeding the overall height of the model utilizing just as lightweight of a material overall.

The invention provides an arrangement in which the outermost sections alternately capture and redistribute air or water, being unique in that they:

Capture air being drawn through as a voluminous force obtaining lift not only from the wind striking the surface but moreso from the backwash being constricted and redistributed through the device.

Both have upper outer surfaces of a segmented conical shape (FIG. 2) of greater area both in their trailing edges and width than the bottom surface. Again, in turn creating lift from currents both through and around the whole device.

Have bottom trailing edges notched (FIG. 2) near corners (2 & 3) with two angles each allowing a significantly larger volume of air to escape (be dispersed) in a downward direction in the exact center of the appropriate bottom trailing edges. This notch also symbolizes a check mark relative to the inventor's original equation.

Reform more efficiently in upward tilted elliptical or shellfish contour which is claimed both as an inherent design feature as well as desirable in certain molded models.

Further reform at top of axis becomes suitably counterproductive, prohibiting destruction from high wind velocities.

The variations of the shape (FIG. 3) as it revolves downwind lends an audible report and seemingly certain marginal lift usual in ornithopters.

Larger axis controls and power conversion mechanics are not shown since they do not form a part of the invention and are well known in the art, and best suited, are the conventional controls provided on equipment similarly used.

Increasing the efficiency of the device by altering the contours as aforementioned, will decrease the angle of tilt needed for lift, while increasing the angle needed for forced descent.

As a model, model display device or toy model: a colorful, logo or map imprinted insert slightly smaller than the area of the bottom (FIG. 2) and prepunched should be inserted before tucking the loose end of tab 1 (3) in for its final weld.

As token cargo it does not significantly impede the efficiency of the assembled unit.

Cut of common paper stock and given sufficient wear through use or excessive humidity, it becomes a likeness of the best possible natural location and design for inner flow braking levers, providing a most suitable improvement for use in much larger and or less flexible units.

An embodiment of the device is not only of intrinsic value as a model but is a new state of the art device most suitable for improvements in wind activated toys, toys (whirling and spinning), toy flying propellers, toy helicopters, wind dynamo plants, air screws, wind generator drive systems, impeller screws, wind wheels, water wheels, combination wind/water wheels, sea or ocean surge generator drive systems, submersible vehicle lightly powered drive systems, outdoor decorations, outdoor display and;

Variations of any of the above uses include combinations or involve stacking more than one of the units on a common axis or multiple sets of axes.

I claim:

1. A rotary device for capturing fluid flow and converting it to rotary mechanical energy, comprising:

a single sheet of thin material having two relatively inverted generally right triangular portions, each having an hypotenuse-like base one-half of which, nearest a central axis point, has a tab-like extension that is partially perforated near the central axis point comprising an angle of slightly less than 180° with the remaining portion of said hypotenuse-like base, with the corresponding edges of each portion parallel to the other and slightly spaced apart from each other, said generally triangular portions each having a crease line extending from said hypotenuse-like base to the right angle vertex slightly offset towards said central axis point, said generally triangular portions being symmetrical about said central axis point and joined together by a generally parallelogram-shaped midsection with a pair of longer edges joined at an angle to a pair of shorter edges, said longer edges being collinear with the sides of said generally triangular portions nearest said central axis point, said shorter edges being respective extensions of said hypotenuse-like bases of said generally triangular portions having said tab-like extensions partially perforated near said central axis point to accommodate folded portions of said thin material;

a rectangular-shaped tab, extending perpendicularly from the base of one of said generally triangular portions from near its distal vertex to a point short of said right angle vertex crease line to an outer edge parallel to said base, said tab having perforations along said base and along said outer edge, said tab forming a midaxis transfer band when creased along said base, smoothly arched over said central axis point and attached at its outer edge to said perforations along one of said shorter edges of said generally parallelogram-shaped midsection and attached at its base perforations to the perforations along the other of said shorter edges respectively, thereby forming an arch over said central axis point, also having a point thereon corresponding to said central axis point, two generally conical-shaped compartments each being formed by creasing said thin material along said right angle vertex crease line and smoothly arched over and attached to the outermost perforated corners of said generally triangular portions to said perforations of each shorter edge of said generally parallelogram-shaped midsection respectively,
said generally conical-shaped compartments having an upper curved portion and a lower flat base portion with a smaller surface area than the upper curved portion; and
a main shaft through both said central axis point and said point on said arched midsection corresponding to said central axis point so that the device can rotate about said main shaft.

2. The rotary device of claim 1 having the shaft vertical.

3. A rotary device wherein an assembly comprising a series of the device of claim 1 is mounted on a common shaft along the central axes of the devices.

* * * * *